(12) United States Patent
Hofer et al.

(10) Patent No.: US 8,584,222 B2
(45) Date of Patent: Nov. 12, 2013

(54) SECURE PIN RESET PROCESS

(75) Inventors: Markus Andreas Hofer, Hagenberg (AT); Werner Waitz, Erfurt (DE)

(73) Assignee: HID Global GmbH (DE)

( * ) Notice: Subject to any disclaimer, the term of this patent is extended or adjusted under 35 U.S.C. 154(b) by 58 days.

(21) Appl. No.: 13/247,468

(22) Filed: Sep. 28, 2011

(65) Prior Publication Data

US 2012/0084855 A1  Apr. 5, 2012

(30) Foreign Application Priority Data

Oct. 1, 2010 (CH) ......................................... 1601/10

(51) Int. Cl.
 *G06F 21/00* (2013.01)
 *H04L 9/32* (2006.01)

(52) U.S. Cl.
USPC ................................ 726/9; 726/20; 713/185

(58) Field of Classification Search
USPC ........................... 713/1, 2, 100, 182, 184, 185
See application file for complete search history.

(56) References Cited

U.S. PATENT DOCUMENTS

| | | | | |
|---|---|---|---|---|
| 5,969,633 | A * | 10/1999 | Rosler | 340/5.25 |
| 7,310,821 | B2 * | 12/2007 | Lee et al. | 726/27 |
| 7,353,536 | B1 * | 4/2008 | Morris et al. | 726/6 |
| 7,650,647 | B1 | 1/2010 | Hansmann et al. | |
| 7,716,491 | B2 * | 5/2010 | Brookner et al. | 713/184 |
| 7,774,829 | B2 * | 8/2010 | Waltermann et al. | 726/6 |
| 2002/0095586 | A1 | 7/2002 | Doyle et al. | |
| 2003/0182584 | A1 * | 9/2003 | Banes et al. | 713/202 |
| 2004/0103325 | A1 * | 5/2004 | Priebatsch | 713/202 |
| 2004/0108377 | A1 | 6/2004 | Rietveld | |
| 2005/0021982 | A1 * | 1/2005 | Popp et al. | 713/184 |
| 2006/0238302 | A1 | 10/2006 | Loving et al. | |
| 2006/0277411 | A1 * | 12/2006 | Reynolds et al. | 713/182 |
| 2007/0300052 | A1 * | 12/2007 | Jevans | 713/1 |
| 2008/0022380 | A1 | 1/2008 | Lu et al. | |
| 2008/0040613 | A1 * | 2/2008 | Challener | 713/185 |
| 2008/0065777 | A1 * | 3/2008 | Sherkin et al. | 709/229 |
| 2008/0120508 | A1 * | 5/2008 | Marconi et al. | 713/184 |
| 2008/0209224 | A1 * | 8/2008 | Lord | 713/185 |
| 2009/0055655 | A1 * | 2/2009 | Ziv et al. | 713/184 |
| 2009/0060199 | A1 * | 3/2009 | von Mueller et al. | 380/278 |
| 2009/0121029 | A1 * | 5/2009 | Asnaashari et al. | 235/492 |
| 2009/0144556 | A1 | 6/2009 | Plet et al. | |
| 2010/0023777 | A1 | 1/2010 | Prevost et al. | |
| 2010/0281252 | A1 * | 11/2010 | Steeves et al. | 713/155 |

FOREIGN PATENT DOCUMENTS

| | | |
|---|---|---|
| DE | 202009007107 | 10/2009 |
| WO | WO 9015211 A1 * | 12/1990 |
| WO | WO 2005/106624 | 11/2005 |
| WO | WO 2008/040996 | 4/2008 |
| WO | WO 2009/023384 | 2/2009 |

OTHER PUBLICATIONS

Search Report for European Patent Application No. EP 11182717, dated Dec. 20, 2011 6 pages.

* cited by examiner

*Primary Examiner* — Christopher Revak
*Assistant Examiner* — Richard McCoy
(74) *Attorney, Agent, or Firm* — Sheridan Ross P.C.

(57) ABSTRACT

A secure password/Personal Identification Number (PIN) reset process is disclosed. The process involves replacing a transportation password/PIN of a terminal with a user-specific password/PIN. During the replacement, the user-specific password/PIN is bound with a token. The token can then be used to securely reset the password/PIN of the terminal back to the transportation password/PIN if the user-specific password/PIN is forgotten or compromised.

6 Claims, 10 Drawing Sheets

SECURE PIN RESET PROCESS

FIELD OF THE DISCLOSURE

The present disclosure is generally directed toward reset procedures for field-dispatched devices.

BACKGROUND

Many access control systems utilize a combination of terminals and credentials to provide security for many different physical and logical entities. It is often the case that terminals, such as credential readers, biometric readers, user-input pads, Radio Frequency Identification (RFID) locks, and the like, are manufactured and shipped to customers with a generic password and/or Personal Identification Number (PIN) which is used to install the terminal. Upon installation of the terminal at the customer's premises, the customer is usually required to replace the generic password/PIN with a customer-specific password/PIN that will be used for subsequent operation of the terminal.

By allowing the customer to program their own personal password/PIN, the terminal manufacturer is allowed to assign each terminal the same generic password/PIN. This enables the manufacturer to focus its time and money on manufacturing the terminal instead of assigning each terminal a specific key and then securely and individually delivering the specific key to each customer. It also allows the customer to program the terminal with a customer-specific password/PIN that likely makes sense to the customer and is, therefore, easy for the customer to remember.

Unfortunately, there are often times where a customer forgets the customer-specific password/PIN that they have assigned to their terminal. In the past, if a customer forgot their customer-specific password/PIN the customer would have to send the terminal back to the manufacturer to have the password/PIN reset back to the generic password/PIN or the customer would spend a great deal of time, and possibly money, engaging customer support to reset the terminal and the password/PIN.

As can be appreciated, any terminal that is capable of making the password/PIN reset process easier and more customer-friendly would be well received in the current market. In particular, such a terminal would save the customer time and money if they ever needed to reset their customer-specific password/PIN. Indeed, this would be a desirable feature for any terminal or computing system which is manufactured with a generic password/PIN and requires a customer to replace that generic password/PIN with a customer-specific password/PIN.

SUMMARY

It is, therefore, one aspect of the present disclosure to provide a password/PIN reset process that can be leveraged by any terminal or computing device that is manufactured and distributed with a generic password/PIN that is ultimately replaced by a customer with a customer-specific password/PIN.

Hereinafter, the terms "password", "PIN", "password/PIN", "password and/or PIN" and any variant thereof will be referred to as security data. There are two types of security data; customer-specific security data and generic security data. Customer-specific security data is any data assigned to a terminal to enhance the security of that terminal. Although most forms of customer-specific security data include customer-input data, any type of customer-provisioned data may be considered customer-specific security data. Typical examples of customer-specific security data include, without limitation, customer-specific password(s), customer-specific PIN(s), customer-specific biometric data (fingerprint, retinal scan, voice samples, etc.), and the like.

Generic security data, as opposed to customer-specific security data, is standard or common security data assigned by a manufacturer or some other merchant in the stream of commerce but not the end customer. Accordingly, generic security data is any data used to secure a terminal during manufacture and/or delivery, but since it is generically assigned, it is generally not as secure as customer-specific security data. In some embodiments, a single version of generic security data (e.g., a common PIN or password) may be assigned to multiple terminals by the same manufacturer. This helps increase the efficiency with which terminals are produced and delivered to end customers. However, since generic security data is not considered as secure as customer-specific security data, the customer is often required to replace the generic security data with customer-specific security data during installation or initialization of the terminal.

The replacement of customer-specific security data with generic security data may be accomplished by a terminal reset process. The successful execution of a terminal reset process may be contingent upon a user presenting the terminal with a token which was previously bound to the terminal when the customer-specific security data was created. The process used to bind a token and a terminal upon the creation of the customer-specific security data may be referred to as a terminal-token binding process. During the terminal-token binding process a clearing code may be created which is stored on the terminal and token, thereby binding the two components together. This particular clearing code can be used to control whether or not a terminal completes a terminal reset process.

In some embodiments, on system startup the terminal checks for the existence of a clearing code or some other data structure which enables the terminal to facilitate a terminal reset process. If there is no such data, the terminal prompts the user to start the terminal-token binding process which results in the generation and storage of customer-specific security data as well as the generation and storage of a clearing code on the terminal and token. If the user skips the binding process, the terminal is still operational, but the terminal will present the prompt for the binding process on each system startup. This procedure ensures that the user is aware of the consequences of not binding the terminal to a token, but leaves the terminal functional when the terminal is upgraded in-field and a token is not yet available.

It may occur that the customer-specific security data becomes lost or compromised. In such a situation it may be necessary to reset the terminal and assign new customer-specific security data to the terminal. The process utilized to achieve this result is referred to as a terminal reset process. The clearing code generated and stored during the terminal-token binding process is a code which may be analyzed and verified to complete the terminal reset process.

In some embodiments, the reset process is started by the user selecting a menu entry and subsequently confirming the start of the process. Upon receiving user confirmation, the terminal prompts the user for the presentation of the token previously used to generate the customer-specific security data. If the token can be validated successfully (i.e., by confirming that the token has a valid clearing code stored thereon), the terminal is reset, meaning that the most recently assigned customer-specific security data is replaced with previously assigned generic data and any other security-relevant settings is deleted on the terminal. The clearing code also becomes invalid for the terminal because it is deleted from the terminal and/or token.

In some embodiments, the clearing code is in the form of a standard symmetric cryptographic key for use with a known symmetric cryptography algorithm. The key may be a random number generated by a random number generator of the terminal or token. Furthermore, the clearing code may be stored in specific memory locations on the token along with a token Unique Identifier (UID). The terminal may store the key along with the token's UID and the memory location utilized on the token to store the customer-specific security data. This enables the terminal to locate the stored customer-specific security data more quickly during the reset process.

In some embodiments, a terminal reset process is provided that generally comprises:

receiving, at a terminal, a key from a token;

comparing the key with a clearing code stored in memory of the terminal;

determining that the key received from the token matches the clearing code stored in the memory of the terminal; and allowing the terminal to replace customer-specific security data stored in its memory with generic security data as a part of the terminal reset process.

In some embodiments, a method of binding a terminal with a terminal-token is provided which generally comprises:

providing a token with a command to generate a clearing code and store the clearing code in a predetermined memory location on the token;

receiving, from the token, the clearing code and an identification of the predetermined memory location;

storing, in memory of the terminal, the clearing code in association with the identification of the predetermined memory location such that a subsequent presentation of the token to the terminal causes the terminal to perform a terminal reset process;

receiving, at the terminal, a key from a token;

comparing the key with the clearing code stored in the memory of the terminal;

determining that the key received from the token matches the clearing code stored in the memory of the terminal; and allowing the terminal to replace customer-specific security data stored in its memory with generic security data as a part of the terminal reset process.

A terminal is also provided which generally comprises:

memory including a reset module configured to receive a key from a token, compare the key with a clearing code stored in memory of the terminal, determine that the key received from the token matches the clearing code stored in the memory of the terminal, and allow the terminal to replace customer-specific security data stored in its memory with generic security data as a part of a terminal reset process; and a processor configured to execute the reset module.

The present invention will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Figure 1:
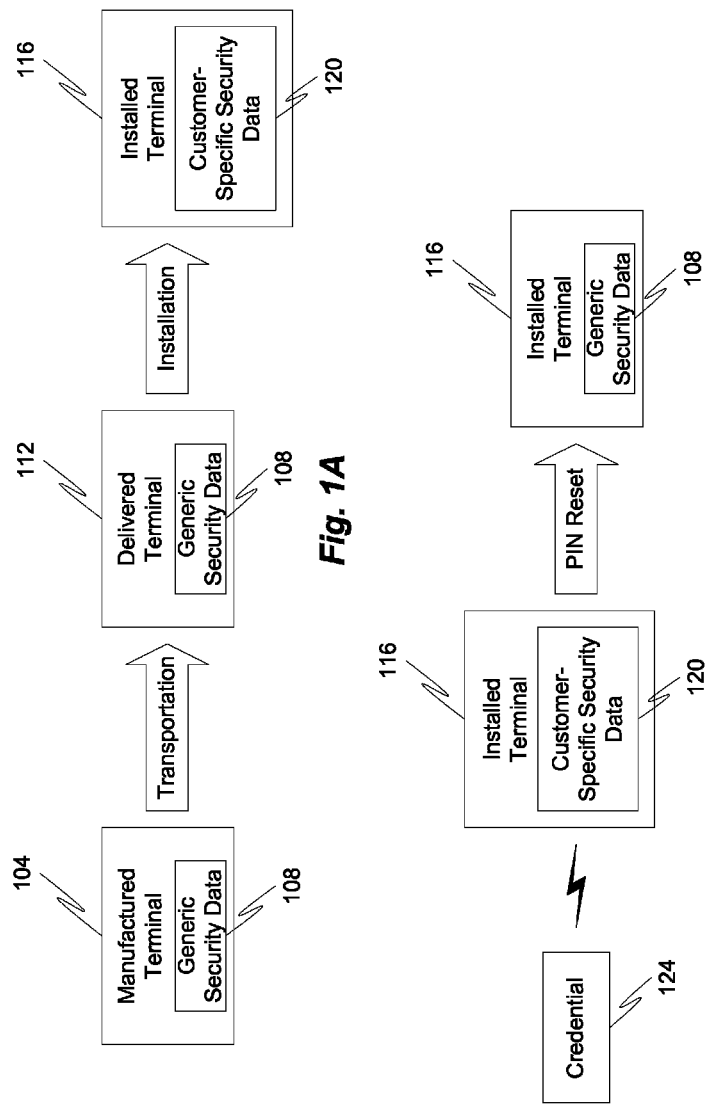
FIG. 1A is a block diagram of a terminal delivery process in accordance with embodiments of the present disclosure.
FIG. 1B is a block diagram of a terminal reset process in accordance with embodiments of the present disclosure.

FIG. 1A shows an illustrative embodiment of a terminal delivery process in accordance with at least some embodiments of the present disclosure. The terminal delivery process generally starts when a manufactured terminal 104 is transported from a manufacturer to a customer. Transportation usually involves physically delivering the manufactured terminal 104 to the customer's premises. In some embodiments the transportation may be carried out by the manufacturer of the manufactured terminal 104, but it may also be possible to utilize a common carrier to deliver the manufactured terminal 104. During this transportation step, the manufactured terminal 104 may be provisioned with generic security data 108. The generic security data 108 may be an encryption key, PIN, password, or some other logical security mechanism which protects the manufactured terminal 104 during the transportation step. In some embodiments, the manufacturer of the manufactured terminal 104 produces a plurality of terminals and delivers such terminals to a plurality of customers. To increase the efficiency of production and delivery of the manufactured terminals 104, the manufacturer may assign the same generic security data 108 (i.e., same encryption key, PIN, password, etc.) to more than one manufactured terminal 104. In some instances, the manufacturer may assign the same generic security data 108 to all manufactured terminals 104 before they are transported to the customer.

Once possession of the terminal has transferred from the manufacturer to the customer, the terminal may be considered a delivered terminal 112. Upon initial delivery of the terminal, the delivered terminal 112 may still comprise the generic security data 108 which was used to secure the terminal during delivery.

The terminal is then installed at which point it becomes an installed terminal 116. As will be discussed in further detail below, the installed terminal 116 may still comprise the generic security data 108, but it is generally in the customer's best interest to replace the generic security data 108 with customer-specific security data 120. In some embodiments, the customer-specific security data 120 represents something that the customer knows and is often unique to a single customer. Accordingly, customer-specific security data 120 is more secure than generic security data 108. Although the installed terminal 116 may also be operated without customer-specific security data 120, it is recommended that customer-specific security data 120 be utilized during operations of the installed terminal 116 instead of generic security data 108.

The installed terminal 116 does not necessarily have to correspond to a terminal which has been physically installed at a particular location. Rather, installation of a terminal may depend upon the type of terminal being employed. For example, a terminal may correspond to an access control reader used to protect a door or entry way. In this scenario, the installed terminal 116 may actually correspond to an access control reader that has been physically installed on or near the entry way. As another example, a terminal may correspond to a hand-held reader, in which case an installed terminal 116 may correspond to a hand-held reader having operating parameters provisioned thereon. As yet another example, a terminal may correspond to a Personal Digital Assistant (PDA), cellular phone, or the like. In these scenarios, an installed terminal 116 may simply correspond to a device that has been activated, personalized, delivered, etc. Accordingly, the term "installed" is intended to cover a broad range of actions or services which can be taken to change possession of a terminal from a manufacturer to a customer, thereby allowing the customer to utilize the terminal.

FIG. 1B depicts a terminal reset process in accordance with at least some embodiments of the present disclosure. Prior to initiating the terminal reset process, the installed terminal 116 may be operated in a normal fashion by the customer. Normal operations of the installed terminal 116 will depend upon the type of terminal being utilized and features provided on the terminal. In some embodiments, the installed terminal 116 may be utilized to secure a physical or logical asset such as a building, door, computer, computer application, physical files, electronic files, and any other type of asset known to be secured by secure access systems. In such embodiments, the installed terminal 116 may be configured to communicate with one or many credentials 124, validate such credentials, receive user inputs in the form of PINs, passwords, biometric data, or the like, validate such user inputs, and make access control decisions.

In some embodiments, the installed terminal 116 may comprise an application running on a general-purpose computing system. The installed terminal 116 may secure the entire computing system, applications on the computing system, data within the computing system, and the like. In such a configuration, the installed terminal 116 is generally configured to receive user input and validate such inputs before releasing the secured asset to a user.

The customer-specific security data 120 is at least some of the data which is used by the installed terminal 116 to secure assets protected by the installed terminal 116. A situation may arise where the customer-specific security data 120 becomes lost, forgotten, or compromised, in which case it may be necessary to implement the terminal reset process depicted in FIG. 1B. In the terminal reset process the customer-specific security data 120 is replaced with the generic security data 108 which was originally provided on the delivered terminal 112. Replacement of the customer-specific security data 120 with generic security data 108 may be initiated by reading a token which was bound to the installed terminal 116 when the customer-specific security data 120 was provisioned. In some embodiments, completion of the terminal reset process described herein requires that the token presented to the installed terminal 116 have a valid clearing code stored thereon. If a token is presented to the installed terminal 116 that does not have a valid clearing code, then the terminal reset process may not be completed.

As used herein, the term "token" may be understood to refer to any credential 124 or portable device including memory that has information stored thereon which can be used to initiate and/or complete a terminal reset process. In some embodiments, the token may be in the form of a portable credential 124 that is machine-readable. Exemplary types of portable credentials 124 include, without limitation, a Radio Frequency Identification (RFID) device, a magnetic card (also known as a magstripe card), a key fob, a portable flash memory device having a Universal Serial Bus (USB) interface, and any other portable device including memory and a machine-readable interface.

Once the security data has been reset, the customer may re-provision the installed terminal 116 with new customer-specific security data 120 to allow the installed terminal 116 to operate as normal and with higher levels of security than that which is offered by operating with the generic security data 108. Re-provisioning the installed terminal 116 with new customer-specific security data 120 may involve performing a second terminal-token binding process whereby a new clearing code is generated and stored on the terminal and token.

Figure 2:
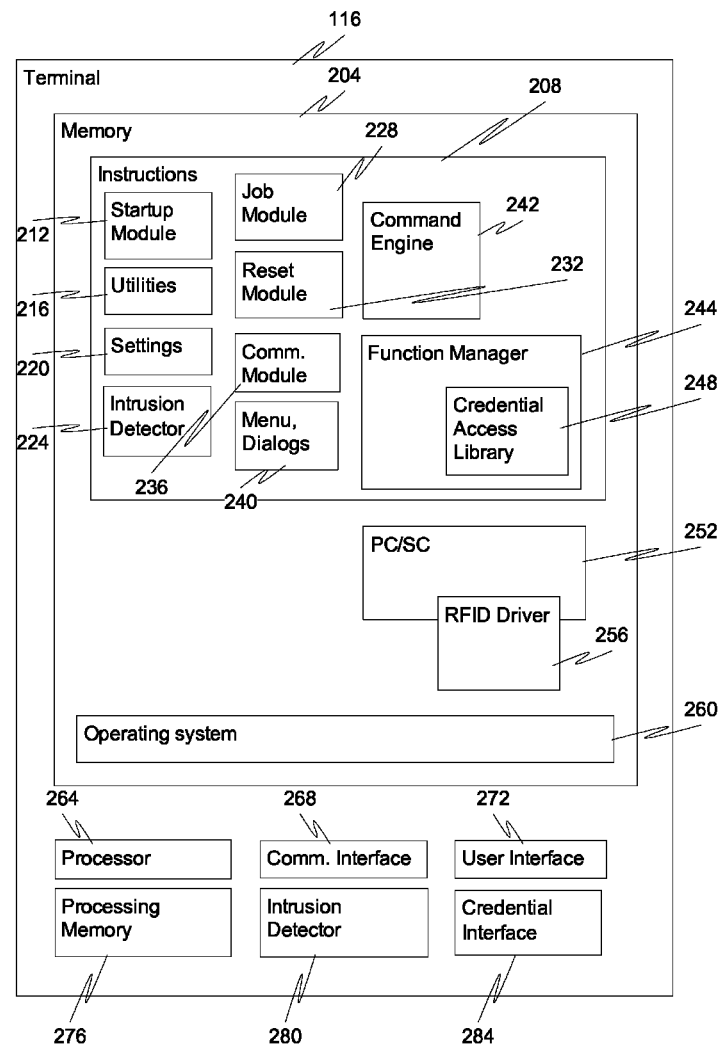
FIG. 2 is a block diagram of a terminal in accordance with embodiments of the present disclosure.

With reference now to FIG. 2, additional details of a terminal 116 will be described in accordance with at least some embodiments of the present disclosure. The terminal 116 may comprise memory 204 that includes a number of instructions 208, modules, and other data structures as well as a processor 264 for executing the instructions 208 and other contents of memory 204.

The terminal 116 may also include a communication interface 268 which allows the terminal 116 to connect to a communication network, thereby enabling the terminal 116 to communicate with other terminals, a control panel, and other networked devices. Exemplary types of communication interfaces 268 include, without limitation, Ethernet ports, antennas, serial data ports, parallel data ports, Small Computer Systems Interface (SCSI) ports, interfaces supporting cellular communications via known cellular communication protocols (e.g., Global System for Mobile Communications (GSM) and variants thereof such as 3G, 4G, etc., General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), and Integrated Digital Enhanced Network (iDEN)) and the like.

In addition to a communication interface 268, the terminal 116 may include a user interface 272 which facilitates user interaction with the terminal 116. The user interface 272 may include one or more user inputs, one or more user outputs, or a combination user input/output. Exemplary user inputs include, without limitation, keypads, buttons, switches, microphones, fingerprint scanners, retinal scanners, and the like. Exemplary user outputs include, without limitation, lights, display screens (projection, LCD, LED array, plasma, etc.), individual LED, speakers, buzzers, etc. Exemplary combination user input/outputs may include a touch-screen interface or any other type of interface which simultaneously provides a user output and user input.

Another type of interface which may be provided on the terminal 116 includes a credential interface 284. The credential interface 284 facilitates communications between the terminal 116 and tokens, such as credential 124. The type of credential interface 284 provided on the terminal 116 may vary according to the type of token that is used both in operation of the terminal 116 as well as the type of token used to facilitate the terminal reset process. In some embodiments, the credential interface 284 includes one or more of an antenna, an array of antennas, an infrared port, an optical port, a magnetic stripe reader, a barcode reader or similar machine-vision components, a Near Field Communications (NFC) interface, or any other component or collection of components which enables the terminal 116 to communicate with credentials 124 and other portable memory devices. In some embodiments, the credential interface 284 may be similar to the communication interface 268. For example, both the credential interface 284 and communication interface 268 may be provided in the form of a USB port, but one port may connect the terminal 116 to a communication network whereas another port may facilitate communications between the terminal 116 and credential 124.

In addition to memory 204, the terminal 116 may also include processing memory 276, which may be in the form of a Randomly Accessible Memory (RAM), cache memory, or any other type of memory used to facilitate efficient processing of instructions 208 by the processor 264.

Whereas the processing memory 276 is used to temporarily store data during processing tasks, the memory 204 is provided to store permanent instructions 208 which control the operational behavior of the terminal 116. The memory 204 and/or 276 may be implemented using various types of electronic memory generally including at least one array of non-volatile memory cells (e.g., Erasable Programmable Read Only Memory (EPROM) cells or FLASH memory cells, etc.) The memory 204 and/or 276 may also include at least one array of dynamic random access memory (DRAM) cells. The content of the DRAM cells may be pre-programmed and write-protected thereafter, whereas other portions of the memory may selectively be modified or erased.

The various routines and modules which may be included in memory 204 comprise one or more of a startup module 212, a utilities module 216, a settings module 220, an intrusion detector 224, a job module 228, a reset module 232, a communications module 236, a menu and dialogs module 240, a command engine 242, and a function manager 244 including a credential access library 248.

The startup module 212 is primarily responsible for controlling and managing the behavior of the terminal 116 during startup (i.e., installation) as well as during the provisioning and re-provisioning of the terminal 116 with customer-specific security data 120.

The utilities module 216 may comprise instructions for certain utilities of the terminal 116. In particular, the utilities module 216 may be a single piece of utility software or a collection of utilities which are designed to help analyze, configure, optimize, and maintain the terminal 116. The types of utilities which may be included in the utilities module 216 include, for example, disk storage utilities, disk cleaners, backup utilities, file managers, archives, anti-virus utilities, data compression utilities, encryption/decryption utilities, launcher applications, registry cleaners, network utilities (to analyze network connectivity), Command Line Interface (CLI) utilities, and Graphical User Interface (GUI) utilities.

The settings module 220 may store and maintain certain settings of the terminal 116. Exemplary settings which may be stored and maintained by the settings module 220 include security settings, operational settings, clock settings, user preferences, manufacturer settings, and the like. The settings may be utilized to control various operational parameters of the terminal 116.

The intrusion detector 224 may comprise a routine that enables the terminal 116 to detect potential attacks on the terminal 116 and attempts to circumvent security features of the terminal 116. In some embodiments, the intrusion detector 224 is enabled to determine that an invalid credential 124 has been presented to the terminal 116 or some other false user input has been provided to the terminal 116. In response to detecting such an event, the terminal 116 may increment a counter. If a predetermined number of these types of events are detected within a predetermined amount of time, then the terminal 116 may implement one or more security measures to protect the terminal 116 and data stored thereon. In particular, the terminal 116 may temporarily slow down processing speeds, temporarily discontinue operations, sound an alarm, notify one or more security personnel, and the like.

As can be seen in FIG. 2, an intrusion detector 280 may also be provided in a physical form rather than or in addition to being provided as instructions 208 in memory 204. For example, a physical intrusion detector 280 may be provided that locks one or more user inputs, secures memory 204 such that it cannot be physically accessed without destroying some or all of the data stored thereon, and the like.

The job module 228 may be responsible for processing various jobs and tasks for the terminal 116 as the terminal 116 is being used in normal operations. The job module 228 may analyze credentials 124 as they are presented to the terminal 116, analyze user inputs at the terminal 116, and the like to determine whether the user presenting the credential 124 or providing the input is allowed to access an asset protected by the terminal 116.

The reset module 232 is the module responsible for executing the terminal reset procedure. In particular, the reset module 232 is executed when customer-specific security data 120 is to be replaced with generic security data 108.

The communication module 236 provides instructions which enable the terminal 116 to communicate with other networked devices. In particular, the communication module 236 may comprise message encoding and/or decoding instructions, message encryption and/or decryption instructions, compression and/or decompression instructions, transcoding instructions, and any other known type of instructions which facilitate communications over a communications network. For example, the communication module 236 may comprise instructions which enable the terminal 116 to create one or more messages or communication packets which are appropriately formatted and transmitted in accordance with a known communication protocol via the communication interface 268. Likewise, the communication module 236 may also comprise instructions which enable the terminal 116 to format messages received over the communication interface 268 for processing by various other components of the terminal 116.

The menu and dialogs module 240 is provided to facilitate communications between the terminal 116 and a user. The menu and dialogs module 240 may be used in combination with a number of other modules and may present messages on behalf of the other modules to a user via the user interface 272. The menu and dialogs module 240 may also be capable of receiving user input with respect to a menu item and translating that received input to an input for another module.

The command engine 242 may be responsible for storing the various commands which enable the terminal 116 to operate and communicate with credentials. In particular, the command engine 242 may be formatted for a specific computing language and, in some embodiments, may implement certain terminal functions when the appropriate command or sequence of user inputs are provided to the terminal 116. As one specific example, the command engine 242 may be configured to format commands for transmission to a credential as well as interpret commands received from credentials. More specifically, the command engine 242 may be configured to generate one or more commands as Application Protocol Data Unit (APDU) commands as is defined by the ISO 7816 standards.

The function manager 244 may be responsible for coordinating the various modules of the terminal. In some embodiments, the function manager 244 may coordinate routines performed by multiple modules such that the output of one module can be utilized as an input by another module. The function manager 244 enables the communication between modules and allows the terminal 116 to perform complex tasks in an efficient manner.

The function manager 244 may also comprise a credential access library 248 which is a data structure for storing data used to validate or invalidate credentials 124 presented to the terminal 116. The function manager 244 may also be used to store clearing codes which are created during a terminal-token binding process as well as verify whether a valid clearing code has been presented to the terminal 116, thereby enabling the reset module 232 to complete a terminal reset process.

Other components of memory 204 may include a Personal Computer/Smart Card (PC/SC) 252, an RFID driver 256, and an operating system 260, which is a high-level application which facilitates interactions between various other modules and applications in memory 204 and hardware components of the terminal 116. The PC/SC 252 and RFID driver 256 may be responsible for facilitating smart-card (i.e., credential 124) integration into the computing environment of the terminal 116. In some embodiments, the credential 124 and terminal 116 utilize a first set of communication protocols to communicate with one another, whereas all other communications and processing components of the terminal 116 are carried out in another protocol. The PC/SC 252 in combination with the RFID driver 256 may facilitate interactions between the terminal 116 and credential 124 and integrate messages received from the credential 124 or any other type of token into the appropriate format such that they can be handled by the various modules stored as instructions 208. The RFID driver 256 may also include commands for controlling operations of the credential interface 284.

Figure 3:
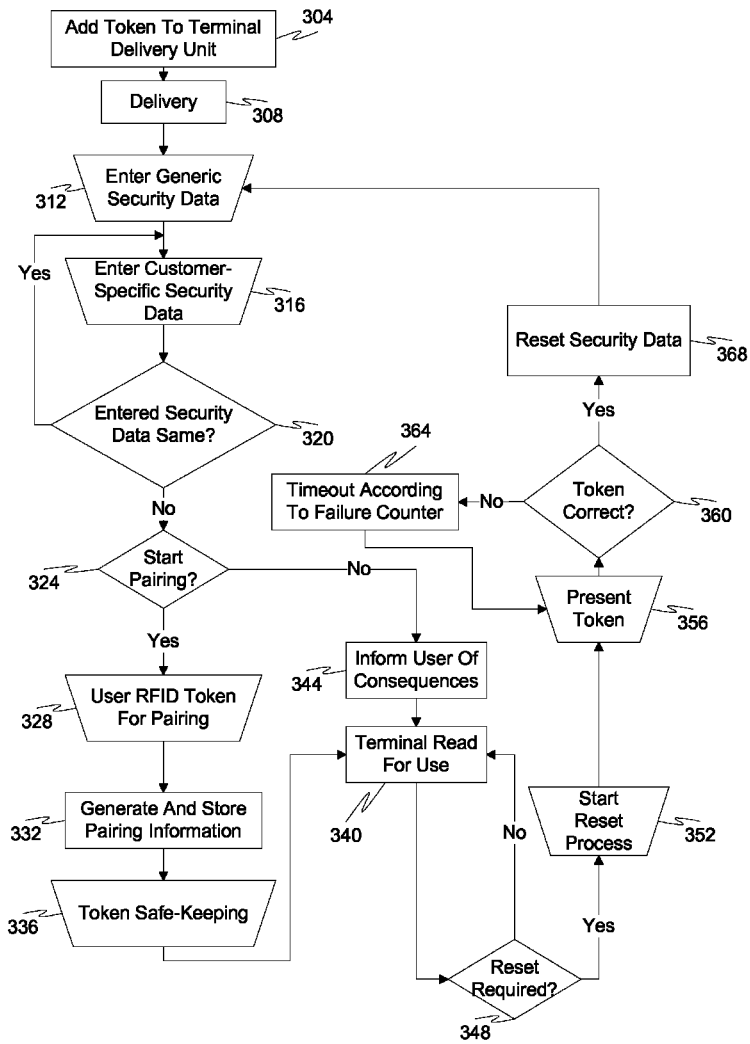
FIG. 3 is a flow diagram depicting a terminal administration process in accordance with embodiments of the present disclosure.

With reference now to FIG. 3, details of an exemplary terminal administration process will be described in accordance with at least some embodiments of the present disclosure. The process is initiated when a terminal is manufactured and a token is provided with the manufactured terminal 104 as part of the system which is ultimately delivered to the customer (step 304). As shown in FIG. 1A, the manufactured terminal 104 is initially provisioned with generic security data 108. The manufacturer provides the token along with the manufactured terminal 104 to enable the customer to ultimately replace the generic security data 108 with customer-specific security data 120 as well as generate and store a clearing code on the terminal and token which can be used to reset the terminal, if necessary.

The process continues with the terminal being delivered to the customer along with the token (step 308). Upon receipt of the delivered terminal 112, the customer begins an installation process which requires the customer to enter, via the user interface 272, or provide, via a credential 124 at the credential interface 284, valid generic security data 108 (step 312). In other words, as a prerequisite to installing the terminal, the customer is required, at a minimum, to prove to the terminal that they know or have access to the generic security data 108.

After the generic security data 108 is provided to the terminal 112, the customer is then allowed to enter customer-specific security data (step 316). This step may include allowing the customer to replace the generic security data 108 with the customer-specific security data 120. In some embodiments, the customer-specific security data 120 may correspond to an input PIN, password, code, alpha-numeric sequence, biometric data, or combinations thereof The startup module 212 then analyzes the generic security data 108 and customer-specific security data 120 provided by the customer (step 320). If the two data values are the same, then the method returns to step 316 and the customer is required to enter some customer-specific security data 120 which is different from the generic security data 108. Such instructions may be generated by the startup module 212 as well as the menu and dialogs module 240 and may then be displayed to the customer via the user interface 272.

After the customer has successfully provided the terminal with customer-specific security data 120 which differs from the generic security data 108, the method continues by determining if the customer wants to start a terminal-token binding process (i.e., pair the token with the installed terminal 116) (step 324). Again, the query may be generated by the combination of the startup module 212 and menu and dialogs module 240 for display via the user interface 272.

If the customer elects to start the terminal-token binding process, the method continues with the customer presenting the token to the installed terminal 116 at the credential interface 284 (step 328). Depending upon the type of token used, the presentation of the token to the installed terminal 116 may vary. In particular, if the token is an RFID token, then the token may only need to be placed within a wireless communication range of the credential interface 284 for a brief amount of time. If the token is a magnetic stripe token, then the token may need to be inserted into the credential interface 284.

After the token has been presented to the installed terminal 116 for pairing, the process continues with the token and terminal generating and storing information to confirm the pairing of the two devices (step 332). In some embodiments, this step of generating, at the token, a clearing code, determining an appropriate storage location within memory of the token, storing the clearing code at the appropriate storage location, informing the installed terminal 116 as to the nature of the clearing code, if not the clearing code itself, as well as the location where the clearing code was stored on the token. This information may then be stored by the installed terminal 116 as an entry in the credential access library 248.

Thereafter, or before, the customer is informed of the need to keep the token in a safe place as well as the potential consequences of misplacing, losing, destroying, etc. the token (step 336). Once the customer has been provided with the token safe-keeping instructions, the installed terminal 116 is allowed to operate in a normal fashion by, for example, reading credentials 124, receiving user inputs, analyzing data received from credentials 124 and/or user inputs, and determining whether the user that presented the credential 124 or provided the input is allowed to access an asset protected by the terminal 116.

Referring back to step 324, if the customer has elected not to pair a token with the installed terminal 116, the process will continue by informing the customer of the consequences of not carrying out the pairing process (step 344). Thereafter, the process proceeds to step 340.

During normal use of the installed terminal 116, the customer-specific security data 120 may be utilized as a part of validating a user's identity. If the customer-specific security data 120 ever becomes lost, misplaced, destroyed, forgotten, or compromised, it may be necessary to perform the terminal reset process. Accordingly, constant determinations are made as to whether or not the terminal reset process is required (step 348). If not, the installed terminal 116 continues to operate in the normal fashion. If, however, it becomes necessary or desirable to reset the terminal, the terminal reset process is initiated (step 352). If the terminal was never bound to a token, then it may become necessary to utilize old terminal reset mechanisms such as disabling the terminal and sending it back to the manufacturer, calling customer support at the manufacturer, and the like. As can be appreciated, such prior art terminal reset mechanisms are inefficient and may be costly.

If, on the other hand, the terminal was bound to a token, the installed terminal 116 awaits presentation of the token which was bound to the installed terminal 116 (step 356). Once a token is presented to the terminal, the terminal invokes the reset module 232 which analyzes the data received from the token to determine if the token presented is actually the token which was previously bound to the installed terminal 116 (step 360).

If the reset module 232 determines that the presented token is not the same token which was bound to the installed terminal 116 (i.e., the presented token does not have a valid clearing code stored thereon or is incapable of providing a valid clearing code to the installed terminal 116), then the intrusion detector 224 increments a failure counter and invokes a security measure if the failure counter has exceeded a predetermined value within a predetermined amount of time or predetermined amount of tries (step 364). The process then returns to step 356 and the installed terminal awaits the presentation of another token if it has not been temporarily shut down as a part of the intrusion detector 224 implementing security measures.

If, however, the reset module 232 confirms that the token presented to the installed terminal 116 is the same token that was previously bound to the terminal during the terminal-token binding process, then the reset module 232 continues by resetting the security data on the installed terminal 116 and invalidating the clearing code at the terminal and/or token (step 368). Resetting the security data on the installed terminal 116 may include replacing the customer-specific security data 120 with generic security data 108 which may or may not be the same generic security data 108 which was provided on the manufactured terminal 104. Thereafter, the process returns to step 312.

Figure 4:
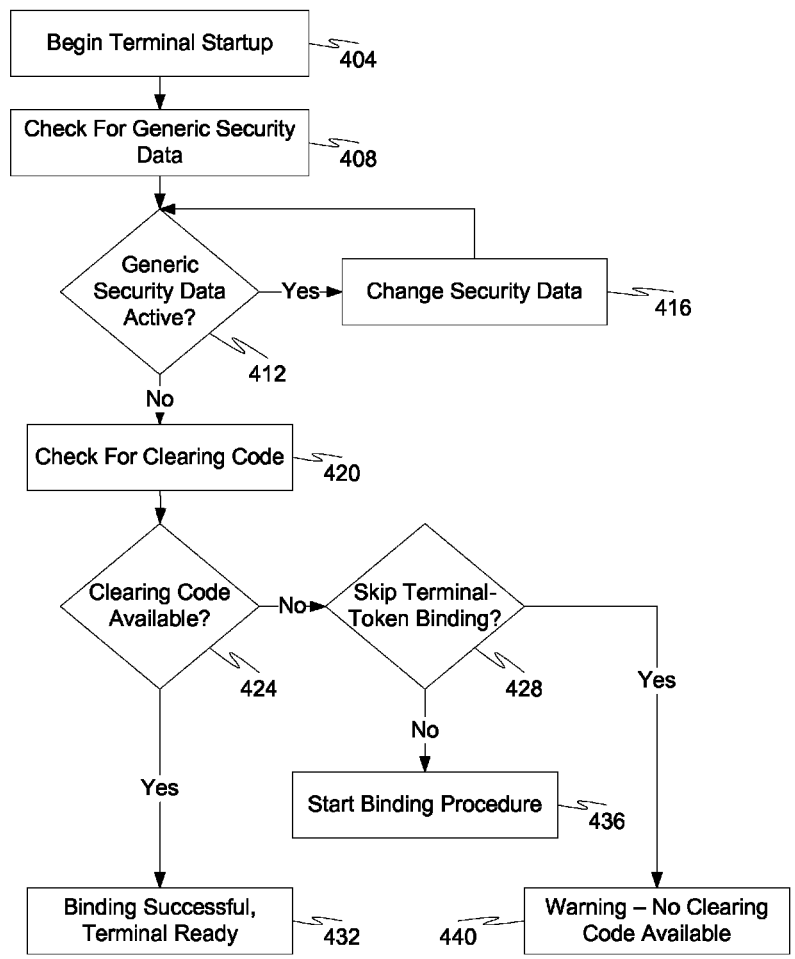
FIG. 4 is a flow diagram depicting the initiation of a terminal startup process in accordance with embodiments of the present disclosure.

With reference now to FIG. 4, details of an exemplary terminal startup process will be described in accordance with embodiments of the present disclosure. The process may be performed when the processor 264 executes the startup module 212. Initially, the delivered terminal 112 is provided with generic security data 108. The startup process is designed to replace the generic security data 108 with customer-specific security data 120 and thereby increase the security associated with operating the installed terminal 116. The terminal startup process begins at installation (step 404) and continues with the startup module 212 searching the memory 204 of the terminal for generic security data 108 (step 408). If such generic security data 108 is found in memory 204, the startup module 212 determines whether the generic security data 108 found is currently active (step 412). As can be appreciated, if no generic security data 108 is found in memory, then the query of step 412 can be answered negatively.

If the startup module 212 determines that the generic security data 108 is still active on the terminal, then the startup module 212 prompts the customer to change the security data and replace the currently active generic security data 108 with customer-specific security data 120 (step 416).

After the startup module 212 has determined that the generic security data is no longer active on the terminal, the startup module 212 then searches the memory 204 for a clearing code (step 420). If a clearing code is determined to be available in memory 204 and that clearing code is determined to be valid based on its characteristics (e.g., size, format, location in memory 204, etc.), then the startup module 212 determines that a terminal-token binding process has already been successfully performed and the terminal is ready for normal usage (step 432).

If, at step 424, the startup module 212 determines that a clearing code is not currently available to the terminal, then the startup module 212 along with the menu and dialogs module 240 generates a prompt that is displayed to the customer. The prompt asks the customer as to whether or not the customer wants to perform the terminal-token binding process. Based upon the user input received in response to the prompt, the startup module 212 determines whether or not the terminal-token binding process will be performed or skipped (step 428). If the customer elected to invoke the terminal-token binding process, then the startup module 212 may continue by implementing the terminal-token binding process (step 436). If the customer elected to skip the terminal-token binding process, then the startup module 212 and menu and dialog module 240 may generate a warning which is presented to the customer (step 440). In some embodiments, the warning may describe the dangers of not performing a terminal-token binding process as well as the benefits associated with actually performing such a process.

Figure 5:
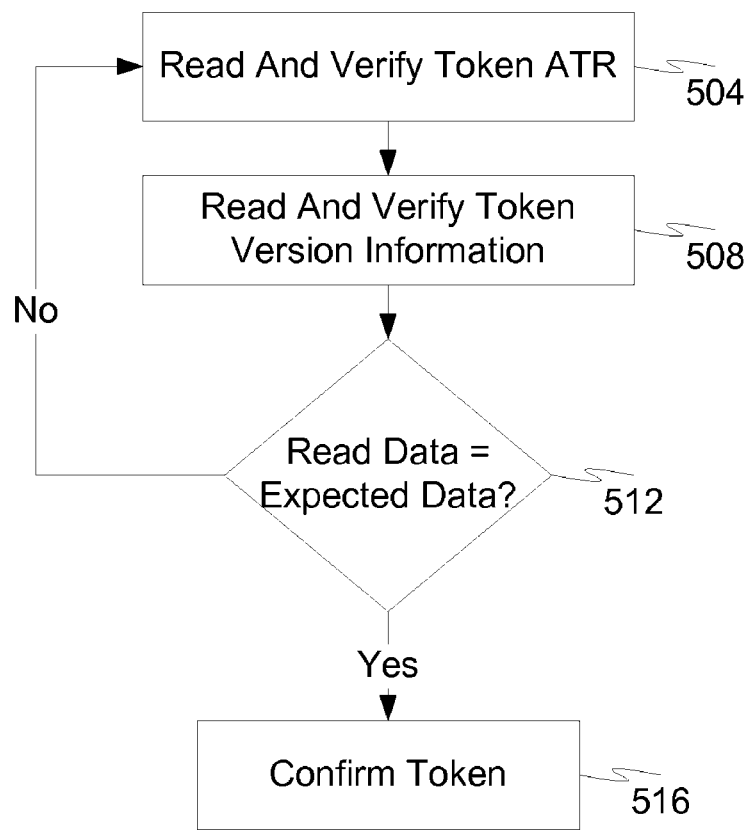
FIG. 5 is a flow diagram depicting a token verification process in accordance with embodiments of the present disclosure.

Referring now to FIG. 5, details of an exemplary token verification process will be described in accordance with at least some embodiments of the present disclosure. The token verification process is usually a prerequisite to performing the terminal-token binding process. More specifically, the terminal-token binding process may require a certain type of token to be used and may further require the token to have certain capabilities before the token is allowed to be bound to the terminal. Accordingly, as a prerequisite to performing the terminal-token binding process, the startup module 212 may analyze the token itself to determine if it is a valid candidate token for the terminal-token binding process.

The token verification process begins when a token is presented to the terminal at the credential interface 284 (step 504) and data from the token is transferred to the terminal via the credential interface 284 (step 508). As can be appreciated, the manner in which the token is presented to the terminal and the format in which the data is read from the token will depend upon the capabilities of the terminal, the capabilities of the token, the type of credential interface 284 provided on the terminal, and other factors. The particular data which is read and analyzed by the startup module 212 may include the token's Answer To Request (ATR) and token version information. This information may identify whether the token is capable of generating an appropriate clearing code, whether the token is capable of storing the clearing code, and whether the token is compatible with the terminal.

If the data read from the token matches the type of data expected by the startup module (i.e., the token satisfies the token requirements for terminal-token binding) (step 512), then the startup module 212 confirms the token as a valid token and allows the terminal-token binding process to continue (step 516).

Figure 6:
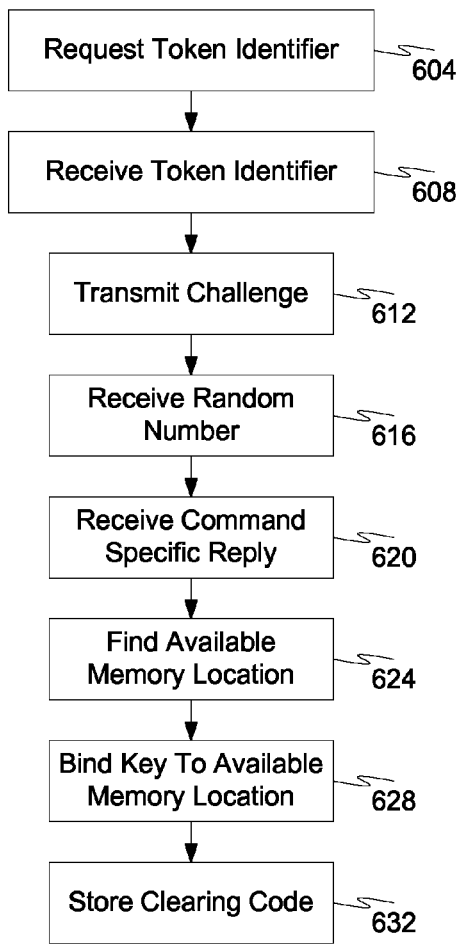
FIG. 6 is a flow diagram depicting a clearing code-creation process in accordance with embodiments of the present disclosure.

With reference to FIG. 6, details of an exemplary clearing code-generation process will be described in accordance with at least some embodiments of the present disclosure. The terminal-token binding process requires the creation of a secure and transferable clearing code. In some embodiments, the clearing code which is generated as part of the terminal-token binding process is a symmetric key and is generated via an AES cryptographic algorithm. The clearing code-generation process beings when the terminal requests the token to provide it with its token identifier (step 604). In some embodiments, the token identifier may comprise a chip number and the request for the identifier may be provided to the token in a specifically formatted request. In some embodiments, the request may be formatted as an APDU command. Such a command may be generated by the command engine 242 and is formatted in such a way that it can be understood by the token. Upon receiving the request from the terminal, the token retrieves the requested data and provides its token identifier back to the terminal (step 608). In some embodiments, the token identifier is a globally unique identification number which is assigned to the token, meaning that no other token of the same type is assigned the exact same identification number. The token identifier also allows early detection of a valid token.

Upon receiving the token identifier, the terminal transmits a challenge to the token (step 612). The challenge provided to the token prompts the token to generate a random number using its random number generator. In some embodiments, the challenge provided to the terminal is in the form of a specifically-formatted challenge command. In response to receiving the command, the token generates a random number and transmits the random number back to the terminal (step 616). The random number may be an encryption key. In a more specific embodiment, the random number may correspond to a 128-bit key generated with any type of known symmetric encryption algorithm.

After the random number has been transmitted to the terminal, the token sends the terminal a command-specific reply which requests the terminal to identify a particular memory location on the token for storing the random number (step 620). The token analyzes the various areas of memory in the token and identifies an appropriate memory location for storing the random number (step 624). More specifically, the random number can be stored on the token by associating the random number to an Application Identifier (AID). An exemplary token will often have a plurality of AIDs and any AID on the token can be used for storage of the random number. In some embodiments, memory locations on the token are assigned AIDs in ascending order. The terminal will analyze whether the token has any available AIDs or whether they are occupied with other data. If all key slots of an AID are occupied, a new AID may be created.

In some embodiments, when a suitable AID has been identified, the AID's access rights have to be set such that unintentional or unauthorized key usage is prevented. Once the terminal has identified a suitable AID and formatted the AID's access rights in a proper manner, the random number is bound to the identified memory location in the token, meaning that the token stores the random number at the identified memory location (step 628).

Furthermore, the terminal stores the random number in memory 204 as part of its credential access library 248 (step 632). The terminal is configured to store the random number, the token identifier, the AID, and the key index associated with the random number. Some or all of this data stored on the terminal and the token is then considered a valid clearing code. In some embodiments, the random number itself is considered the clearing code. In some embodiments, the clearing code can include more than just the random number. By storing the random number, token identifier, AID, and key index associated with the random number, the terminal is able to find the random number on the token during a terminal reset process, thereby enabling the terminal to identify a token as the one with which it was bound during the terminal-token binding process.

Figure 7:
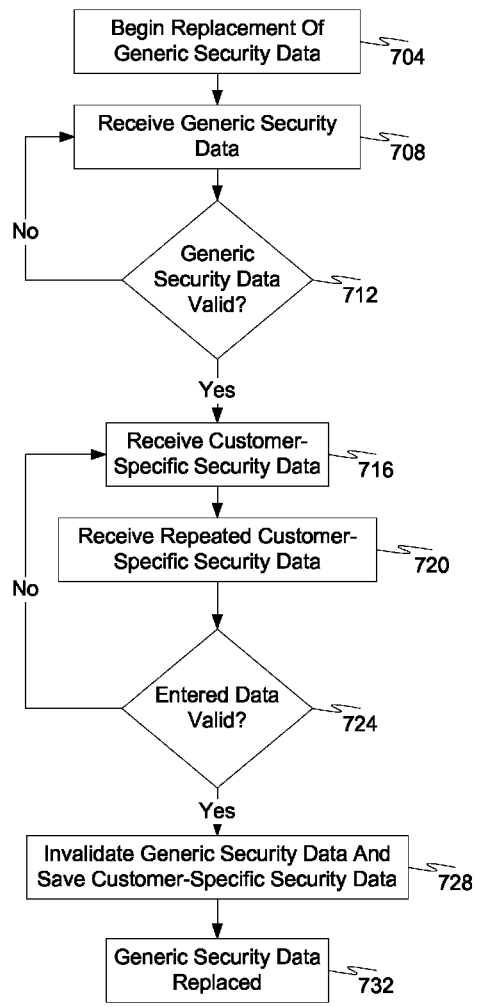
FIG. 7 is a flow diagram depicting a security data-replacement process in accordance with embodiments of the present disclosure.

With reference now to FIG. 7, an exemplary security data-replacement process will be described in accordance with at least some embodiments of the present disclosure. In some embodiments, the instructions for executing this process may be included in the startup module 212 and/or reset module 232 depending upon whether generic security data 108 is being replaced with customer-specific security data 120 or vice versa.

The process begins at step 704 when a customer instructs the terminal that they desire to initiate the security data-replacement process. Thereafter, the terminal receives from the customer a generic security data input (step 708). In some embodiments, the generic security data is provided as pure user input. In some embodiments, the generic security data is provided by presenting a credential 124 with the generic security data stored thereon.

The process continues by analyzing whether the generic security data received from the customer is valid (step 712). If the query is answered negatively, then the process returns to step 708. If the query is answered affirmatively, then the customer provides the terminal with customer-specific security data 120 (step 716). The customer-specific security data 120 may be received in the form of a PIN, password, code, alpha-numeric sequence, biometric data, or combinations thereof. The customer then provides the customer-specific security data 120 at least a second time to ensure that the customer entered the customer-specific security data 120 as intended and to ensure that the customer-specific security data 120 is validly stored by the terminal (step 720).

The multiple versions of input customer-specific security data are then compared to ensure that each input version matches the other input versions as well as to confirm that the customer-specific security data 120 conforms to minimum security data requirements (step 724). Exemplary minimum security data requirements may include minimum PIN length, minimum password strength (i.e., appropriate number of characters, variety of characters, sufficient degree of randomness, etc.), minimum amount of biometric data inputs (e.g., minimum number of fingerprints, minimum number of retinal scans, minimum length of voice sample, etc.), and so on.

If the customer-specific security data received from the customer is determined to be invalid, then the method returns to step 716. If, on the other hand, the input customer-specific security data is valid, then the generic security data 108 is invalidated (step 728) and the customer-specific security data 120 is saved as a replacement thereof (step 732).

Figure 8:
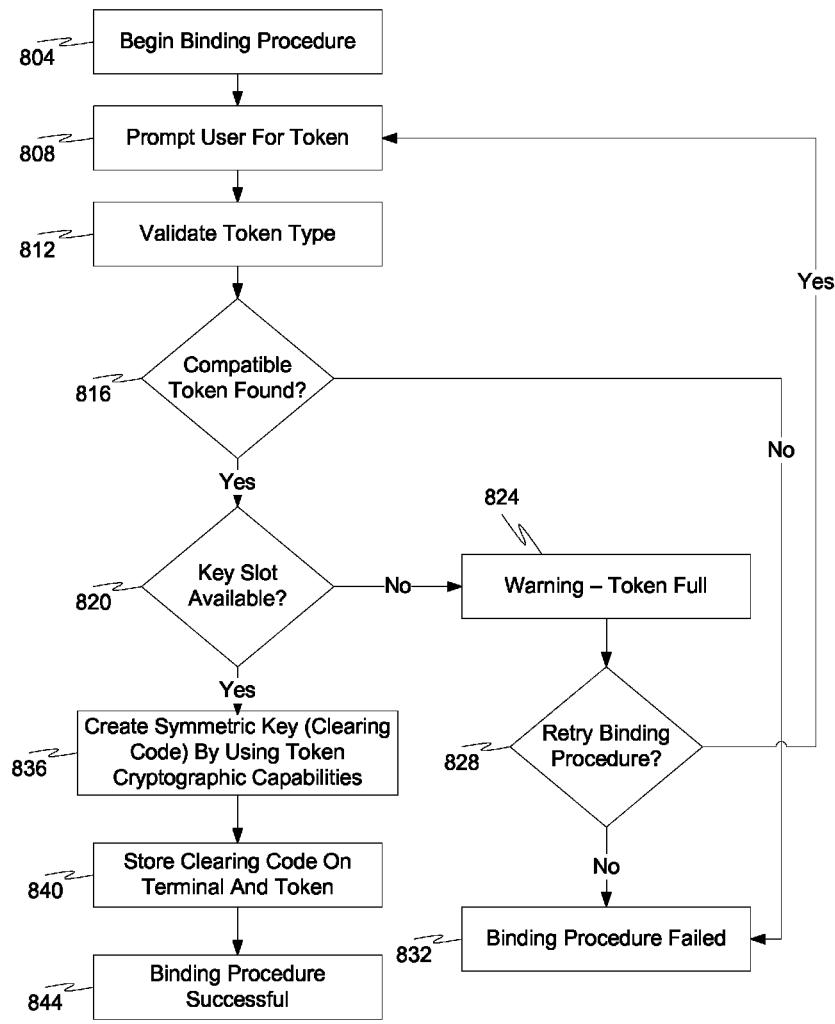
FIG. 8 is a flow diagram depicting a terminal-token binding process in accordance with embodiments of the present disclosure.

Details of an exemplary terminal-token binding process will now be discussed with reference to FIG. 8. The terminal-token binding process is initiated when a user input is received indicating that such a process is desired (step 804). In some embodiments, there may not be any user input requirement to initiate the process. Rather, the process may be initiated automatically when a valid token is presented to the terminal.

After the binding process has been initiated, the process continues by prompting the customer for the token which is desired to be bound with the terminal (step 808). When the token is presented to the terminal, the terminal validates the token type (step 812) and determines whether the presented token is valid and suitable for the terminal-token binding process (step 816). If the query to step 816 is answered negatively, then the binding process is failed (step 832).

If the query to step 816 is answered affirmatively, then the binding process continues and the terminal determines whether the token has an appropriate key slot (i.e., memory location) available for storing the clearing code (step 820). If the token does not have an available key slot, the terminal provides the customer with a warning that the token's memory is full (step 824). The terminal may then query the customer as to whether or not they would like to retry the terminal-token binding process (step 828). If the process is to be retried, then the process returns to step 808. If the process is not to be retried, then the binding process is failed (step 832).

Referring back to step 820, if the token is determined to have a key slot available, then the process continues with the token creating a clearing code by utilizing its cryptographic capabilities (step 836). The newly generated clearing code, which may be in the form of a symmetric encryption key having a fixed bit length, is stored at a predetermined memory location in the token as well as being stored in the terminal's memory 204 (step 840).

After the clearing code has been stored at both the token and terminal, the terminal-token binding process is considered successful and a notification to that effect may be provided to the customer via the user interface 272 (step 844).

Figure 9:
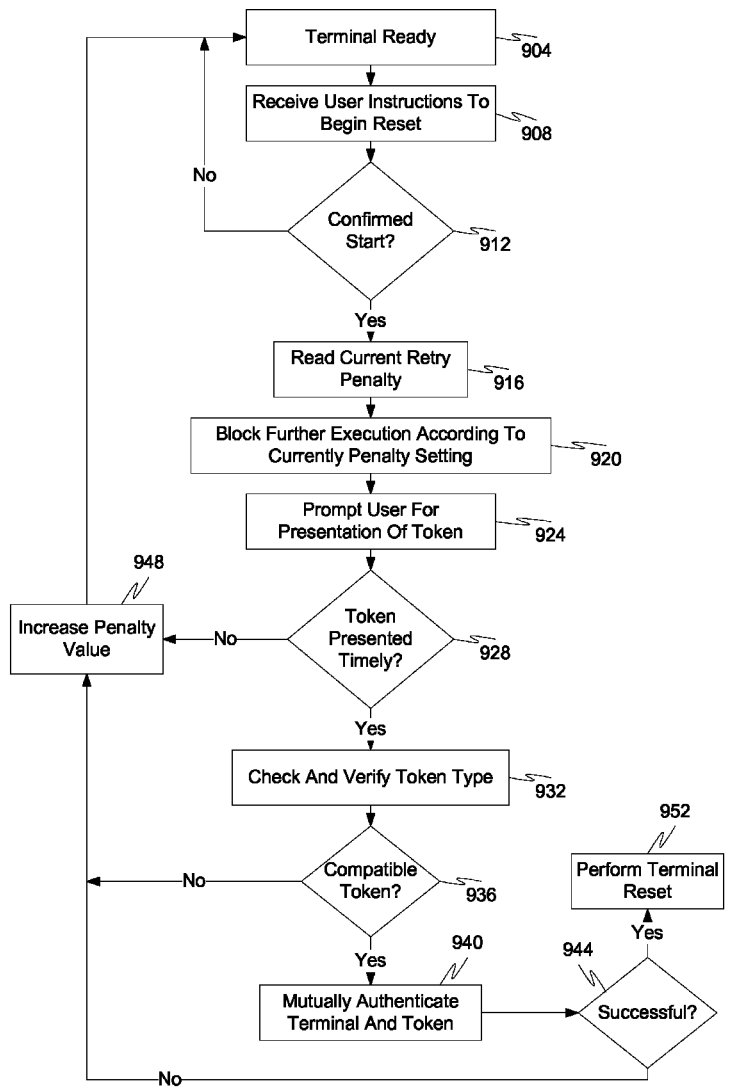
FIG. 9 is a flow diagram depicting a reset procedure in accordance with embodiments of the present disclosure.

Referring now to FIG. 9, an exemplary terminal reset process will be described in accordance with at least some embodiments of the present disclosure. The process begins when the terminal is in a ready state (i.e., ready to receive a user or credential input) (step 904). The process continues when the terminal receives a user input instructing the terminal to invoke the reset module 232 and begin the reset process (step 908). The terminal may provide a second query to the customer asking them to confirm their desire to initiate the terminal reset process (step 912). If the customer confirms that the terminal reset process is to continue, the process continues; otherwise, the process returns to step 904.

In the event that the terminal reset process is to continue, the reset module 232 communicates with the intrusion detector 224 to determine the current retry counter value (step 916). Depending upon the current value of the retry counter, the reset module 232 may partially or entirely block further execution of the terminal reset process (step 920). The retry penalty may be stored persistently, meaning that power disruptions to the terminal do not influence the stored values or penalty waiting times. Typical penalties which may be imposed due to the retry counter reaching or exceeding a predetermined value include delaying authentication processes of the terminal, temporarily disabling the terminal, and the like. In some embodiments, the penalty time (i.e., time to authenticate a token with the terminal) doubles on each failure. After a predetermined number of failures (e.g., 6 or more times), the terminal may delay authentication processes for a substantial amount of time (e.g., 36 minutes or more) to ensure attack resistance.

Depending upon the penalty retry counter value, the next step may be performed immediately or it may be delayed. Eventually, the customer is prompted to present a token to the terminal (step 924). Once the prompt is provided to the customer, the terminal begins a timer to determine if the token has been timely presented (i.e., presented within a predetermined amount of time after the prompt was provided to the customer) (step 928).

If a token is not presented promptly, then the process may either return to step 904 or the intrusion detector 224 may increment the retry penalty value (step 948). If a token is timely presented, then the reset module 232 analyzes the data retrieved from the token to determine if the token is of the appropriate token type for purposes of completing the terminal reset process (steps 932 and 936). Specifically, the reset module 232 analyzes the token identifier of the currently presented token with the token identifier stored during the terminal-token binding process to determine if the token identifiers match.

If the token is determined to be incompatible, meaning that the token identifier received from the token does not match the token identifier stored in memory 204 of the terminal in connection with the clearing code, then the retry penalty value is incremented due to the failed attempt (step 948). Alternatively, step 948 may be skipped in this instance due to the token failing for lack of being the appropriate token type.

If the token is determined to be compatible, then the terminal and token perform a mutual authentication whereby the terminal retrieves the AID stored in its memory 204 with its version of the clearing code and selects a key index based on that AID (step 940). In one embodiment, the key index is provided to the token in the form of a "CHALLENGE RESPONSE" command. The token responds to the command by retrieving the data stored in the identified key index and providing the data back to the terminal. If the data provided back to the terminal matches the clearing code stored at the terminal, then the mutual authentication of the token and terminal is considered successful (step 944). The process then continues with the reset module 232 completing the steps necessary to reset the terminal (step 952). On successful authentication, the reset module 232 may re-activate the generic security data 108, delete the clearing code in its memory 204 and on the token, delete any connector pairing data, and restart the terminal (e.g., power-cycle and reboot). Upon completion of the reboot, the customer will be prompted to assign new customer-specific security data 120 and a terminal-token binding process will need to be performed again if the advantages (e.g., easy, cost-effective, and secure terminal reset capabilities) associated with such a process are desired by the customer.

If the mutual authentication of the terminal and token was unsuccessful, then the penalty value is increased (step 948) and the terminal reset process returns to the terminal ready state.

Figure 10:
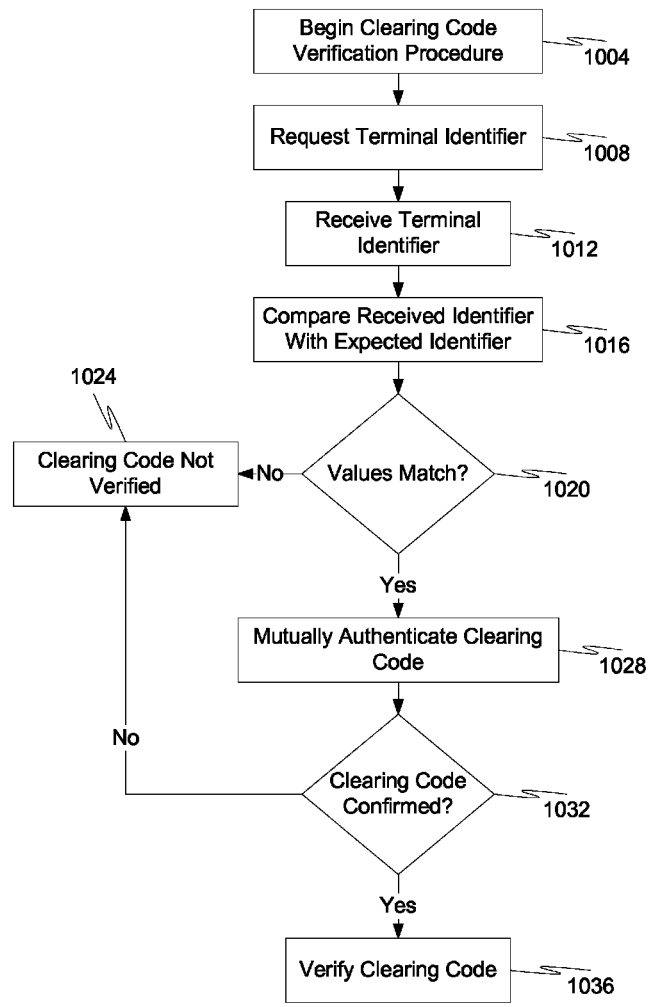
FIG. 10 is a flow diagram depicting a clearing code verification process in accordance with embodiments of the present disclosure.

Referring now to FIG. 10, an exemplary clearing code verification procedure will be described in accordance with at least some embodiments of the present disclosure. The process begins when the terminal receives a clearing code from a token during a terminal reset process and the terminal needs to analyze the received clearing code to determine if the token which provided the clearing code is the same token which was bound to the terminal during the terminal-token binding process (step 1004).

The process continues with the terminal requesting that the token provide the terminal with its token identifier (step 1008). The token responds by retrieving its token identifier and providing it back to the terminal (step 1012). The reset module 232 compares the received token identifier with an expected token identifier (i.e., the token identifier of the token which is currently bound with the terminal) (step 1016). Based on the comparison of the received token identifier and expected token identifier, the reset module 232 determines whether the received and expected token identifiers match one another (step 1020).

If there is not a match between the received and expected token identifier, then the clearing code is not verified as valid (step 1024). If there is a match between the received and expected token identifier, then the process continues with the terminal generating both a "SELECT APPLICATION" command and an "AUTHENTICATE" command and transmitting the commands either together or separately to the token (step 1028).

In the "SELECT APPLICATION" command, the terminal retrieves the AID associated with its stored clearing code and provides that AID to the token. This causes the token to process subsequent commands with data from the identified AID. The "AUTHENTICATE" command may include a request to provide a key from the identified AID. In particular, the token is required to appropriately respond to the "AUTHENTICATE" challenge by retrieving the key stored in the key slot of the identified AID and providing the retrieved key back to the terminal.

The reset module 232 then analyzes the key provided by the token and determines if the value matches the clearing code stored in its memory 204 (step 1032). If the key provided by the token matches the clearing code, then the clearing code is verified (step 1036). If, however, the key provided by the token does not match the clearing code stored in memory 204, then the clearing code is not verified (step 1024).

Although many steps of the terminal reset process and terminal-token binding process are described as being performed by the terminal or token, one of ordinary skill in the art will appreciate that certain functions described herein may be executed at the token rather than the terminal and vice versa. For example, the random number generator may be provided at the terminal or the reset module 232 may be provided on a token. There is no requirement that the components discussed as performing certain functions be the only components of a system which are capable of performing such functions.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
performing a terminal-token binding process which comprises:
  providing a command to a token to generate a clearing code and store the clearing code in a memory location on the token;
  receiving at a terminal, from the token, the clearing code and the memory location on the token; and
  storing, in memory of the terminal to be bound with the token, the clearing code in association with the memory location such that a subsequent presentation of the token to the terminal causes the terminal to perform a terminal reset process; and
subsequent to performing the terminal-token binding process, performing the terminal reset process which comprises:
  receiving, at the terminal, a key from the token;
  comparing the key with the clearing code stored in memory of the terminal; and
  determining that the key received from the token matches the clearing code stored in the memory of the terminal during the terminal-token binding process, wherein the terminal replaces customer-specific security data stored in its memory with generic security data in response to the determining.

2. The method of claim 1, wherein the generic security data is assigned by a manufacturer to a plurality of terminals including the terminal, wherein the customer-specific security data is uniquely assigned to the terminal and not others of the plurality of terminals, wherein the clearing code comprises an encrypted random number encrypted with an encrypted key of the token, and wherein the token comprises a computer-readable credential.

3. The method of claim 2, wherein the generic security data was used to secure the terminal during delivery.

4. The method of claim 1, wherein the terminal reset process further comprises deleting the clearing code from the memory of the terminal and deleting the key on the token and wherein the terminal reset process further comprises restarting the terminal.

5. A non-transitory computer-readable medium comprising processor-executable instructions that, when executed by a processor of the terminal, perform the method of claim 1.

6. A terminal, comprising:
memory including a reset module configured to receive a key from a token, compare the key with a clearing code previously generated by and received from the token during a terminal-token binding process and stored in memory of the terminal, determine that the key received from the token matches the clearing code stored in the memory of the terminal during the terminal-token binding process, and then cause the terminal to replace customer-specific security data stored in the memory with generic security data in response to the determining and as a part of a terminal reset process; and
a processor configured to execute the reset module.

\* \* \* \* \*